UNITED STATES PATENT OFFICE.

ERICH RIETZ, OF ELBERFELD, GERMANY, ASSIGNOR TO SYNTHETIC PATENTS CO., INC., OF NEW YORK, N. Y., A CORPORATION OF NEW YORK.

NEW PHARMACEUTICAL PRODUCT.

1,218,209.     Specification of Letters Patent.     Patented Mar. 6, 1917.

No Drawing.     Application filed October 6, 1914. Serial No. 865,291.

*To all whom it may concern:*

Be it known that I, ERICH RIETZ, doctor of philosophy, chemist, citizen of the German Empire, residing at Elberfeld, Germany, have invented new and useful Improvements in New Pharmaceutical Products, of which the following is a specification.

I have found that new and therapeutically valuable substances can be obtained by treating cholic acid with formic acid, a mixture of acetic acid anhydrid and formic acid or the mixed anhydrid of acetic acid and formic acid $CH_3$—CO—O—CHO.

The new products which are probably methylene compounds of cholic acid ($C_{24}H_{40}O_5$) are tasteless whitish powders soluble in alcohol, glacial acetic acid and benzene. They contain from 15–25 per cent. formic acid and have proved to be valuable remedies characterized by their property of increasing the activity of the gall-bladder and of disinfecting the gall by splitting off formic aldehyde in it. The daily dose is 3 grams.

In order to illustrate the new process more fully the following example is given, the parts being by weight:—100 parts of cholic acid (from ox-bile) are heated during 3 hours to 100° C. together with 400 parts of the mixed anhydrid of acetic acid and formic acid (boiling point 29° C. under a pressure of 18 mm.). After cooling the solution is slowly introduced into 5000 parts of ice water, the precipitate is filtered off and crystallized from dilute alcohol. It melts at 193–195° C. is soluble in alcohol, glacial acetic acid and benzene, soluble with difficulty in ether, insoluble in ligroin. By heating the cholic acid with formic acid alone a product can be obtained melting at about 100° C. and containing about 15 per cent. formic acid. By heating in a vessel provided with a reflux condenser the cholic acid with formic acid and sodium formate a product can be obtained melting at about 190° C. and containing about 24 per cent. formic acid.

I claim:—

1. The herein described new and therapeutically valuable products being chemically compounds of cholic acid and formic acid which are tasteless whitish powders soluble in alcohol, glacial acetic acid and benzene; containing from 15–25 per cent. formic acid, substantially as described.

2. The herein described new and therapeutically valuable product being chemically a compound of cholic acid and formic acid which is a whitish powder soluble in alcohol, glacial acetic acid and benzene, difficultly soluble in ether and insoluble in ligroin; melting at 193–195° C., substantially as described.

In testimony whereof I have hereunto set my hand in the presence of two subscribing witnesses.

ERICH RIETZ. [L. S.]

Witnesses:
   HELEN NUFER,
   ALBERT NUFER.